May 9, 1967 G. SCHONENBACH 3,318,648
ARTICLE CARRYING AND DISPLAY CASE
Filed April 14, 1965 4 Sheets-Sheet 1

INVENTOR
GEORG SCHONENBACH
BY
Burgess, Dinklage & Sprung
ATTORNEYS

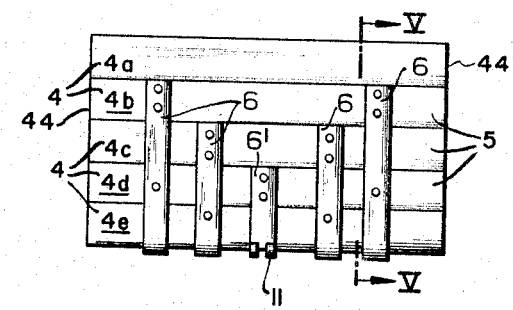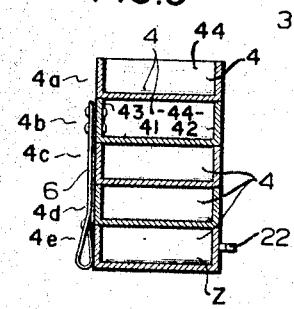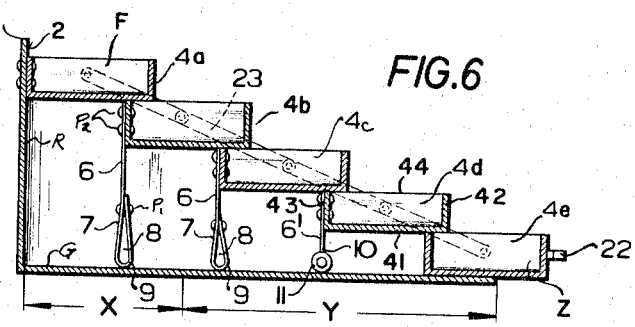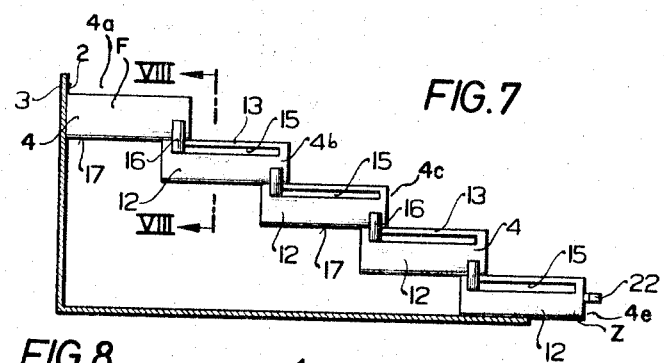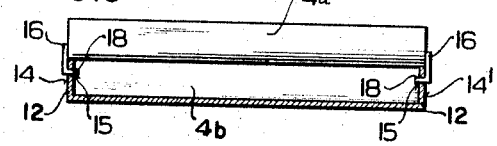

May 9, 1967 G. SCHONENBACH 3,318,648
ARTICLE CARRYING AND DISPLAY CASE
Filed April 14, 1965 4 Sheets-Sheet 3
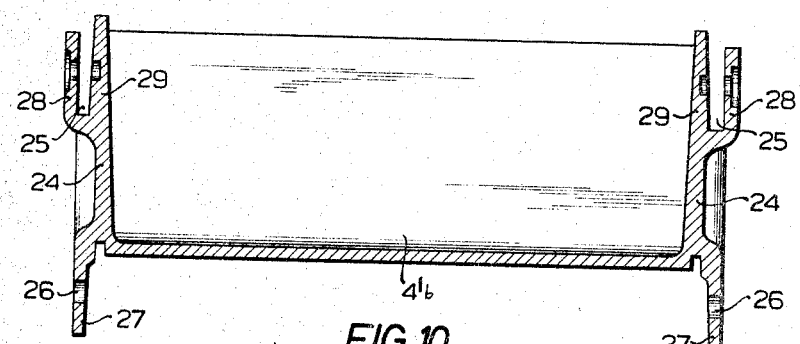
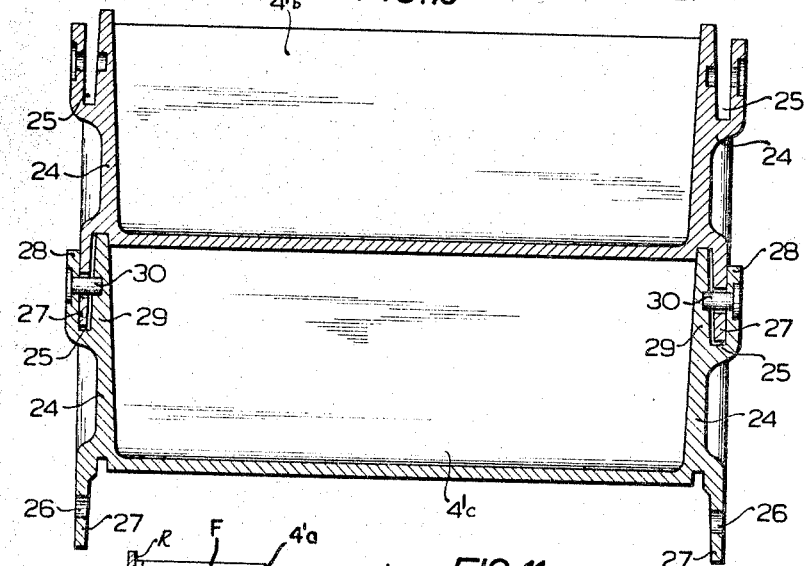
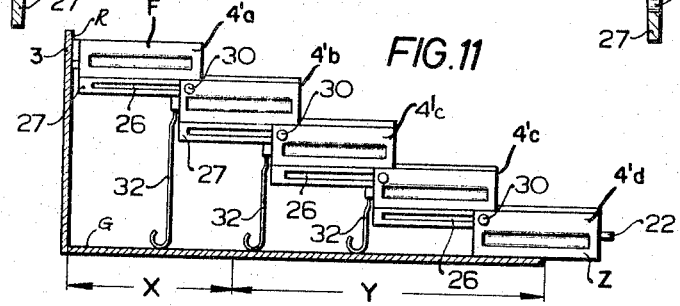
INVENTOR
GEORG SCHONENBACH
BY
Burgess, Dinklage & Sprung
ATTORNEYS

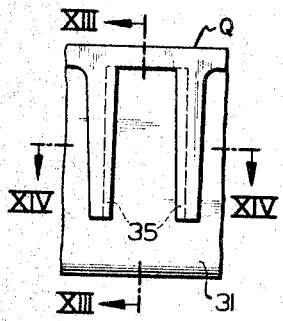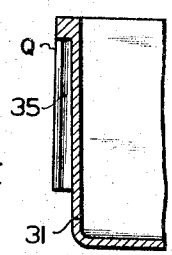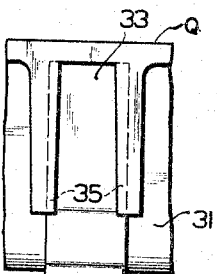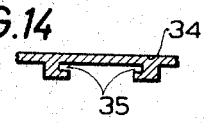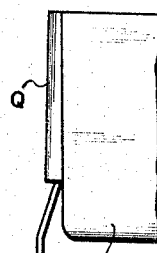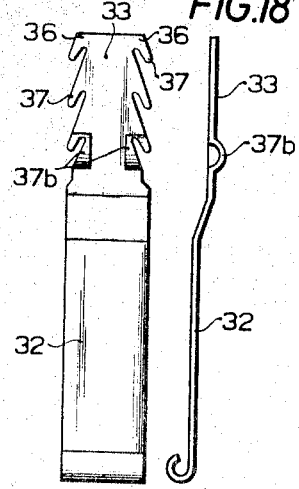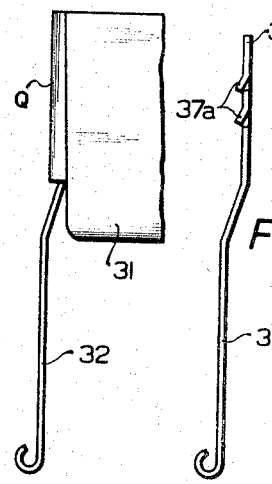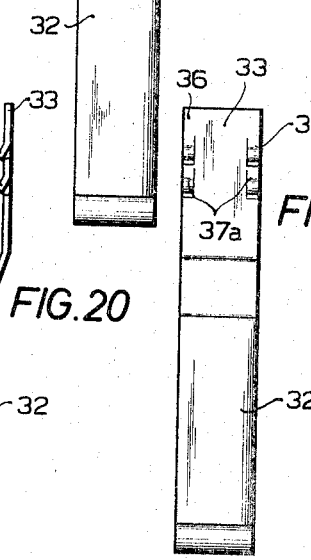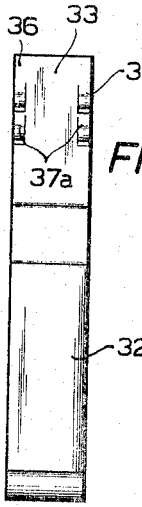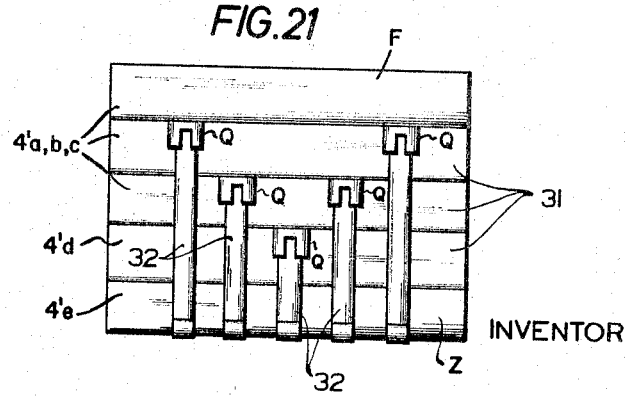

3,318,648
ARTICLE CARRYING AND DISPLAY CASE
Georg Schonenbach, Remscheid-Lennep, Germany, assignor to Schonenbach OHG, Remscheid-Lennep, Germany, a corporation of Germany
Filed Apr. 14, 1965, Ser. No. 448,056
Claims priority, application Germany, Apr. 15, 1964, Sch 34,981; Dec. 15, 1964, Sch 36,245
7 Claims. (Cl. 312—273)

This invention relates in general to article carrying and display cases and more particularly to a carrying case for tools and similar articles which can be opened to display said tools or articles in terrace-stacked holding trays.

While in general, carrying and display cases are known in the prior art, such known cases do not offer the advantage of accommodating the articles to be carried in such a manner that when the case is set down and opened, the articles can be exposed to view and readily accessible in their respective holding trays.

In accordance with the invention, a plurality of slidable article holding trays are provided within a transport case having a front wall which is hingedly connected to an adjoining bottom wall.

When articles are to be carried in the article holding trays, the front wall of the transport case is folded up into a position opposite that of the rear wall so that the trays, which are stacked in superposed tiers, one above the other, with the lowermost tray resting upon the bottom wall of the transport case, are contained within said transport case and are enclosed laterally by its front, rear and side walls. The transport case is also provided with a top cover which is hinged to the upper portion of the rear wall and is releasably fastened to the upper portion of the front wall to lock it in place when the transport case is moved about. A handle is preferably attached to the top cover of the transport case to facilitate carrying.

To render the articles in the trays accessible for use, and/or to display them, the top cover of the transport case is swung back and the front wall is swung forward and downward upon its hinge connection and thereby folded into a position which is coplanar with the bottom wall, so as to provide in effect an extended support surface that will permit the lowermost tray to be slidably drawn forward therealong and beyond its adjacently overlying tray, so that the contents of said lowermost tray may be exposed.

As the lowermost tray is drawn progressively forward, the overlying trays, excluding the upper tray, will be automatically drawn forward in succession and their contents exposed by reason of the slidable inner connections provided between adjacent superposed trays. The uppermost tray which is fixedly secured to the rear wall of the transport case, remains in place, and does not slide forward as do the other trays. Actually, there is no need for sliding the uppermost tray because its contents are visibly exposed and accessible whenever the top cover of the transport case is swung back.

To provide access to the articles, the trays are constructed so as to be open at their respective top portions, and in general, each tray has a bottom wall, a rear wall, a pair of oppositely disposed side walls, and a front wall, said walls being joined edgewise to form an open top box-like tray.

Under normal conditions of use, the transport case bottom wall will be set in a horizontal attitude when the case is to be opened.

For simplicity in manufacturing the article carrying case of the instant invention, the transport case is constructed as a hollow rectangular box and the trays are preferably made of uniform width and approximately equal, but slightly smaller than the inside width of the transport case bottom wall, and with a uniform length slightly smaller than the inside length of the transport case front and rear walls. With this arrangement, when the transport case is closed, the trays will be stacked one on top of the other with the exterior surfaces of their rear walls being adjacent to the interior surface of the transport case rear wall, and said trays will be restrained from forward movement by the front wall thereof.

When the transport case is open, and the trays are slidably extended forward, they will form a terrace-like arrangement wherein, by reason of their open tops, the articles laid in each of them will be clearly visible and accessible.

In contrast to some of the article carrying cases and tool chests of the prior art which utilize slidable drawer trays guided in runners affixed to the case side walls, the article carrying case of the invention permits simultaneous access to articles contained in adjacent trays as well as to the articles in all of the trays, whereas in such prior art carrying cases and tool chests, only those articles which were in sufficiently spaced-apart drawers were accessible simultaneously.

Another distinguishing feature of the article carrying case according to the invention lies in the fact that the movable trays slide in guiding engagement with one another, and slide along parallel paths at respectively corresponding elevations above the bottom wall of the transport case. Thus, the trays are displaced forward to expose their contents, and backwards against the rear wall of the transport case as when closing it without any change in their elevation.

In this feature, the article carrying case of the invention can be readily distinguished conventional fishing tackle boxes that use parallelogram linkage connected article trays for providing simultaneous access to articles in a plurality of trays.

Since in the article carrying case of the invention, the movable trays are slidably interconnected, with the lowermost tray being supported by the folded down front wall of the transport case, and the uppermost tray being fixedly supported by the rear wall thereof, it is not absolutely necessary to provide side walls on the transport case, although such side walls are advantageously provided to improve its rigidity, and to maintain the alignment of the bottom wall in relation to the rear wall thereof.

By providing a suitable overlap between adjacent trays, and/or additional support or guide means, such as locking means, the trays can be prevented from tipping or tilting when in the extended open condition and heavily loaded.

In a preferred embodiment of the invention, depending finger members are connected to the rear walls of each of the movable trays, excluding the lowermost, to provide stabilization and support for said trays when they are extended into a terraced display configuration. At least one finger member is provided for each of the aforesaid movable trays, said fingers extending downward therefrom for distal end contact with the guide surface defined by the coplanar bottom and front walls of the transport case. In this manner, a more substantial support of the individual trays is obtained, so that when they are heavily burdened with articles such as tools, they will not tilt or tip and will remain in a substantially level position.

The construction details of said finger members can be varied, as desired. For example, a resilient band loop can be fastened to the distal end of a rod or bar-like finger member for sliding contact with the guide surface. Also, the finger members can be formed entirely from resilient band loops, such as by bending a flat strip of steel or plastic into a loop and fastening the opposite strip portions together so as to form a double leaf spring finger having an elastic distal end loop. Instead of using an elastic loop contact finger, a roller which is journaled at the distal end of the finger member can be substituted to provide rolling contact between the finger and guide surface.

By connecting the support finger members to the rear walls of the trays, in the extended position, the intermediate movable trays (i.e. those between the lowermost and uppermost trays) will be supported at their rear portions by their own finger members, and at their front portions by the indirect support provided by the rear wall and finger member of the underlying tray.

When the transport case is open with its front wall laid flat, i.e. coplanar with the bottom wall, it is only necessary to pull out the lowermost tray in order to draw out the remaining intermediate trays in succession.

According to one embodiment of the invention, this single, pull feature is obtained by providing stopped slots or grooves in the side walls of the lowermost and intermediate movable trays. These slots are disposed in proximity to the upper edges of the side walls, and run longitudinally in directions parallel to the bottom wall of the transport case. At the lower front portion of the side walls of the uppermost and intermediate trays are affixed follower members which are arranged for sliding engagement with the longitudinal slots of adjacent trays. When the lowermost tray is drawn forward, its slots will slide along the follower members of the overlying tray until said follower members engage the rearward stopped ends of the slots. As the lowermost tray is advanced further, its stop slot ends will engage the follower members of the adjacently overlying tray and draw it forward until its slot ends engage the follower members of the next overlying tray. In this manner, the succeeding overlying trays are drawn forward and are rendered accessible merely by continuously pulling out the lowermost tray, until the last movable tray which adjacently underlies the uppermost fixed tray has been drawn forward.

In essence, the article carrying case of the instant invention provides a plurality of slidably interconnected article holding trays, the uppermost of which is fixedly connected to the rear wall of the transport case, and the lowermost tray is supported by and in sliding contact with a guide surface defined by the coplanar bottom and extended front walls of the transport case.

As may be appreciated by the artisan, the slidable interconnection between the movable trays can be accomplished in many ways. What is required in accordance with the invention is a slidable connection means joining each pair of adjacent superposed trays to one another, beginning with the slidable connection of the lowermost tray to its adjacently overlying tray, and ending with the slidable connection of the last movable tray adjacently underlying the fixed uppermost tray to said uppermost tray.

For example, a suitable slidable interconnection between adjacent movable trays can be obtained by means of tongue and groove slide joints. In such case, the side walls of the movable trays can be provided with upwardly opening groove members, and downwardly projecting tongue or guide runner members. The tongue-like guide runners of the overlying trays are inserted for slidable engagement into the groove members of adjacently underlying trays.

Limit stops are provided in each slidable connection means to limit travel of trays relative to each other, so that all of the movable trays can be drawn forward into a terraced configuration by pulling on the lowermost tray, and pushed back against the transport case rear wall by pushing in said lowermost tray.

It is therefore, an object of the invention to provide an article carrying case having a plurality of article holding trays which can be displaced into a configuration wherein the contents in all of such trays are visible and accessible.

Another object of the invention is to provide an article carrying case as aforesaid wherein the article holding trays are superposed and slidably interconnected for guided movement into a terraced display configuration.

Another and further object of the invention is to provide an article carrying case as aforesaid, wherein the lowermost and uppermost trays are supported by a transport case and the intermediate movable trays are supported by one another via their respective slidable interconnections.

Other and further objects and advantages of the invention will become apparent from the following detailed description and accompanying drawings in which:

FIG. 4 is a rear elevation view of the article holding trays used in the article carrying case of FIGS. 1–3, showing the arrangement of said trays apart from the transport case in which they are installed.

FIG. 5 is a sectional view of the holding tray arrangement of FIG. 4 taken along line A–B therein.

FIG. 6 is a sectional side elevation view of the article holding tray arrangement of FIGS. 4 and 5, schematically showing said trays as installed in a typical transport case, and in an extended display configuration.

FIG. 7 is a sectional side elevation view of an article holding tray arrangement according to another embodiment of the invention, installed in a transport case and extended into a configuration similar to that of FIG. 6.

FIG. 8 is a sectional front elevational view of the article holding tray arrangement according to FIG. 7 taken along the line C–D.

FIG. 9 is a sectional front elevational view of an article holding tray used in an article carrying case according to another embodiment of the invention.

FIG. 10 is a sectional front elevation view of two superposed and interconnected trays of the type shown in FIG. 9.

FIG. 11 is a schematic side elevation view, partly in section, of an article carrying case according to another embodiment of the invention which uses the article holding trays of FIGS. 9 and 10.

FIG. 12 is an elevation view of a detail portion of the rear wall of an article holding tray according to FIGS. 9 and 10, showing a support finger attachment receptacle.

FIG. 13 is a sectional view taken along line A–B of FIG. 12.

FIG. 14 is a sectional view taken along line C–D of FIG. 12.

FIG. 15 shows the tray wall and attachment receptacle of FIG. 12 with a support finger installed in said receptacle.

FIG. 16 is a side view of the support finger installation arrangement of FIG. 15.

FIG. 17 is a more detailed rear view of the support finger shown in FIGS. 15 and 16.

FIG. 18 is a side view of the support finger shown in FIG. 17.

FIG. 19 is a rear view of a modified type of support finger which can be substituted for that shown in FIGS. 15–18.

FIG. 20 is a side view of the support finger shown in FIG. 19.

FIG. 21 is a rear elevation view of an article holding tray arrangement similar to that shown in FIG. 4 which uses the support finger attachment arrangement exemplified by FIGS. 15 and 16.

Figure 1:
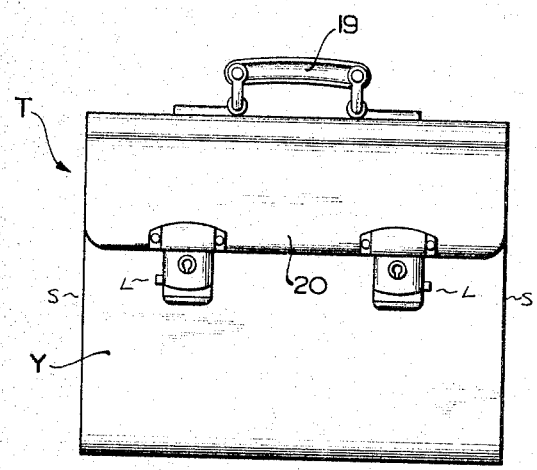
FIG. 1 is a front elevation view of an article carrying case according to a preferred embodiment of the invention.
Figure 2:
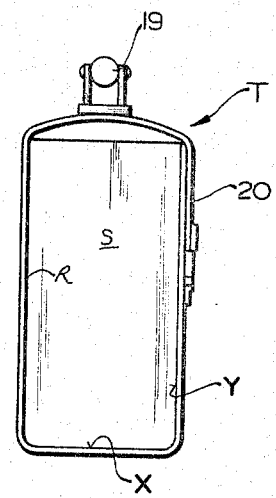
FIG. 2 is a side elevation view of the article carrying case of FIG. 1.
Figure 3:
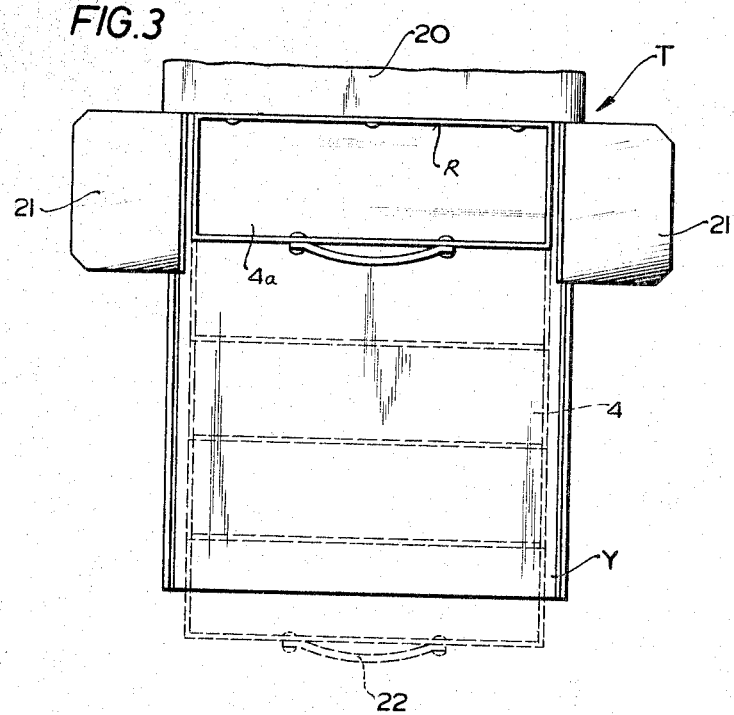
FIG. 3 is a plan view of the article carrying case of FIGS. 1 and 2 showing said case in an opened configuration wherein its article holding trays are displayed and accessible.

Referring now to FIGS. 1, 2 and 3 which shows the general appearance of the article carrying case A according to the invention, FIGS. 1 and 2 show the external appearance of a transport case T which houses the interconnected and stacked article holding trays 4 illustrated in FIG. 3 in the condition wherein said trays 4 are retracted into a superposed arrangement within the transport case T, and said transport case T is closed as when carrying the case A about.

FIG. 3 shows the arrangement of the article carrying case A when the transport case T is opened and the trays 4 are extended into a terraced configuration for displaying their contents, and/or for access to their contents.

For purposes of illustration and example, the transport case T is depicted in the form of a hollow rectangular box having a rear wall R, a bottom wall X adjoining said rear wall R, and a front wall Y which adjoins the bottom wall X and is hingedly connected thereto. When the transport case T is in its closed configuration, as represented by FIGS. 1 and 2, the front wall Y is oppositely disposed and approximately parallel to the rear wall R. The case T is expediently provided with a cover flap 20 which is hingedly connected to the rear wall R and can be swung forward to overlap the front wall Y, and releasably locked thereto by the catches L, as when the case T is to be closed, and said flap 20 can be swung back as in FIG. 3 when the case T is to be opened for access to the article holding trays 4. The transport case T is also provided with side walls S, and side flaps 21 hingedly connected thereto, and a handle 19 fastened to the cover flap 20.

To open the case T, the flaps 20 and 21 are swung back, thereby exposing the uppermost tray 4a, and the front wall Y is swung forward and downward into a position substantially coplanar with the bottom wall X, to define an extended guide surface formed by the interior surface of the bottom wall X and the extended front wall Y.

For purposes of the invention it is not absolutely necessary that the front wall Y be hingedly connected to the bottom wall X, as by a hinge member (not shown), but rather that the front wall Y be flexibly connected to the bottom wall X so as to be capable of being swung downward and forward into a coplanar extended position therewith.

FIGS. 4, 5 and 6 illustrate the arrangement of the article holding trays 4a–4e in relation to the transport case T, with FIG. 5 representing the configuration assumed by the trays 4a–4e when retracted against the wall R, as when the case T is closed, and FIG. 6 representing the configuration assumed by said trays 4a–4e when the case T is opened and the trays 4a–4e are drawn forward for access.

According to the invention, a plurality of trays 4a–4e are arranged in superposed adjacent relation to each other and are slidably displaceable with respect to each other and the rear wall R along paths parallel to the guide surface G defined by the coplanar walls X and Y. The uppermost tray 4a is fastened to the wall R for support thereby, by any suitable conventional means such as rivets.

Guide means in the form of finger members 6 and 6' are provided for guiding the movement of the intermediate movable trays 4b, 4c and 4d in fixed spaced parallel relation to the guide surface G. The finger members 6 and 6' are disposed in a downwardly depending direction to contact the surface G with their distal ends and are attached to their respectively corresponding trays 4b, 4c, 4d, preferably at the rear walls thereof. At the lower portions of fingers 6 are provided resilient band loops 7, the closed end portions 8 of which are in sliding contact with the surface G, as at 9. When the trays 4b and 4c are drawn forward away from the wall R, as when going from the configuration of FIG. 5 to that of FIG. 6, the end portions 8 slide along the surface G and provide a resilient elastic support for the rear portions of the trays 4b and 4c. The rear portion of the movable tray 4d is similarly supported by the finger 6', which has a roller 10 journaled to its distal end for rolling contact with the surface G as at 11.

As will be described in greater detail hereinafter in connection with other embodiments of the invention, the support fingers 6 and 6' are susceptible of many variations in form and detail. For example, the fingers 6 can be constructed by bending over a strip of resilient material such as spring steel or plastic and riveting the folded strip leaves at $P_1$ to form the loops 7, and then attaching the double leaf flat portion by riveting to the tray 4b as at $P_2$. Where a less resilient support finger (not shown) is desired, the fingers 6 and 6' can be replaced by riveted rods or bars (not shown) having suitably rounded distal ends for smooth sliding contact with the surface G.

As will be apparent from FIG. 6, the fingers 6 and 6' directly prevent the counterclockwise rotation of the trays 4b, 4c, and 4d, and indirectly prevent their clockwise rotation as well, since the lower front portions of the trays 4b, 4c and 4d are in sliding abutting contact with the upper rear portions of their adjacent overlying trays 4c, 4d and 4e respectively.

It is not necessary to provide any support fingers 6, 6' for the uppermost tray 4a which is fixedly connected to the wall R, or for the lowermost tray 4e which is supported in sliding contact by the surface G.

For purposes of simplification, the article holding trays 4a–4e have been illustrated as open top, rectangular box-like trays of mutually uniform dimensions and having bottom walls 41, front walls 42, rear walls 43 and pairs of opositely disposed side walls 44, it being understood that other suitably constructed trays (not shown) can be substituted for those shown.

In going from the configuration of FIG. 5 to that of FIG. 6, the lowermost tray 4e slides along the guide surface G, as for example, by pulling on its handle 22, and the upper edges of the rear and side walls 43 and 41 of the trays 4e, 4d, 4c and 4b slide along the bottom walls 41 of their respectively overlying adjacent trays 4d, 4c, 4b and 4a. Thus the movable trays 4b, 4c, 4d and 4e travel along paths of constant elevation with respect to the guide surface G.

As shown in FIG. 4, at least one, and preferably two finger mmebers 6, 6' are attached to each of the movable trays 4b, 4c and 4d, with said fingers 6, 6' being of such width and arranged in relation to each other, preferably symmetrically about the width center line of their corresponding trays 4b, 4c and 4d, so as not to overlap or interfere with one another when the trays 4a–4e are retracted into the configuration of FIG. 5.

In the embodiment of the invention exemplified by FIG. 6, additional guide means in the form of flexible, stretchable bands 23 are provided. The bands 23 are connected to the side walls 44 of the trays 4a–4e, and serve to flexibly interconnect said trays 4a–4e to one another. When the trays 4a–4e are drawn into the terraced configuration of FIG. 6, the bands 23 (one band 23 for each side wall 44) are elastically extended and serve to aid in maintaining the parallel alignment of the trays 4a–4e by preventing their rear walls 43 from being drawn past the front walls 42 of adjacently overlying trays. Thus in effect, the bands 23 act as limit stop means with respect to the relative sliding displacement of the trays 4a–4e. Because the bands 23 are made of a stretchable material such as plastic, they automatically retract when the trays 4a–4e are restored to the configuration of FIG. 5, and hence, do not interfere with movement of said trays 4b–4e in and out of the transport case T. For the aforesaid purpose of limiting the relative forward displacement of the trays 4b–4e, the bands 23 are constructed so as to have elastic properties which permit them to yield readily up to a length which allows the trays 4b–4e to be drawn forward with a selected overlap between adjacent trays, so that a stable terraced tray configuration can be realized, and that further extension of the trays is strongly inhibited.

In the embodiment of the invention as exemplified by FIGS. 7 and 8, the trays 4a–4e are slidably interconnected and guided by providing the trays 4b–4e with horizontally running longitudinal slots 15 disposed at the upper edges 13 of their side walls 14, 14', and by providing the trays 4a–4d with guiding follower members 16 affixed to the lower front portions of their side walls, 14, 14', said follower members being disposed in sliding engagement with the slots 15. The ends of the slots 15 are stopped to cooperate with the hook-like rejecting tongue members 18 inserted therethrough in limiting the relative displacement of the trays 4a–4e.

As the lowermost tray 4e is drawn forward, the follower 16 affixed to the tray 4d slides in the slot 15 of the tray 4e until it is stopped against the end thereof. By continuing the forward displacement of the tray 4e, the overlying tray 4d will be drawn along with it, as will be the successively overlying trays 4c and 4b as their slot 15 ends are engaged in succession by the follower 16 affixed to correspondingly overlying trays, until the trays 4a–4e are in the configuration of FIG. 7.

As can be readily appreciated, the embodiment of the invention represented by FIGS. 7 and 8 does not require any support fingers 6, 6' or elastic bands 23 to support the trays 4a–4e and prevent them from becoming separated, by reason of the stopped slot 15 and tongue member 18 slidable interconnecting guidance means.

FIGS. 9–21 relate to another and further embodiment of the invention wherein the article holding trays 4'a–4'e are slidably interconnected and guided by longitudinally slotted runners 27 which slidably travel in grooves 25. As indicated by FIGS. 9–11, the trays 4'a–4'e are of identical modular construction, and have side walls 24 which are provided with guide grooves 25 running parallel to one another, said grooves 25 being open at the top. The guide runners 27 which are parallel to one another extend downward from the lower portion of the walls 24, and are so shaped and arranged in relation to the grooves 25 that the trays 4'a–4'e can be stacked one above the other with the runners 27 and grooves 25 of adjacent trays being in slidable mating engagement as illustrated by FIG. 10.

In each runner 27, a longitudinal slot 26, stopped at both ends, is provided. The slot 26 likewise extends parallel to one another and to the runners 27, grooves 25 and guide surface G.

Through the wall portions 28 and into the wall portions 29 which are arranged to define the grooves 25, a stop pin 30 is inserted. The stop pin 30 cooperates with the stopped end slot 26, through which it also passes, to limit the relative displacement of the trays 4'a–4'e so as to prevent them from becoming separated when extended by pulling out the lowermost tray 4'e into the configuration shown in FIG. 11. As in the case of the embodiment exemplified by FIG. 7, pulling out the lowermost tray 4'e will cause the other trays 4'd, 4'c, 4'b, to be drawn out in succession by reason of their slot 26 ends being pulled by the stop pins 30 of their corresponding adjacently underlying trays.

While the embodiment represented by FIGS. 9–11 does not require any support members such the as fingers 6, 6', for stability, such support members can be advantageously provided in the form of depending fingers 32 which are fastened to the rear walls 31 of the trays 4'b, 4'c and 4'd.

As shown by FIGS. 12, 13 and 14, the rear walls 31 of the trays 4'a–4'e are provided with downwardly extending projections Q which are contoured to define finger retaining grooves 35, which can be appropriately tapered for greater finger 32 holding capability. The upper portion 33 of the fingers 32 are fastened to the trays 4'b, 4'c, 4'd, by inserting them into the grooves 35 until their upper edges 36 abut against the upper end of said grooves 35, as indicated by FIGS. 15 and 16. As indicated by the detailed views of FIGS. 17, 18, 19 and 20, the fingers 32 can be advantageously provided with laterally projecting tongues 37, and/or transversely projecting tongues 37a, and/or curved dimpled projections 37b for improved holding contact within the grooves 35.

By comparing the tray arrangement of FIG. 21 with that shown in FIG. 4, it can be noted that both are similar as to tray and support finger arrangement, but that in FIG. 4, the fingers 6, 6', are riveted to the trays, whereas in FIG. 21, the fingers 22 are fastened to the tray walls 31 simply by insertion into the grooves 35 of the projections Q. The type of finger 32 fastening exemplified by FIGS. 15, 16 and 21 offers certain definite advantages over fastening by means of rivets. For example, no special tools are required for inserting the fingers 32 into the grooves 35. Also, a larger finger holding area can be provided in the grooves, for lower stresses, as compared with that provided by rivet connections.

While the various parts of the article carrying case A of the invention can be constructed of different materials, as a guide to the artisan, it can be said in general that the transport case T can be constructed of leather, or plastic, and the article holding trays, particularly the trays 4'a–4'e of FIGS. 9 and 10, which can be integrally molded, can be made of plastic. The fingers 6, 6' and 32 are made of a spring-like elastic material such as steel, or plastic, in the form of strips.

As can be appreciated by the artisan, the construction details of the various parts of the article carrying case A according to the invention, and in particular the manner of assembling its slidably interconnected trays, can be varied in ways that will become obvious upon reading the foregoing disclosure. For example, in those embodiments of the invention which use slot and follower guide means, as represented by FIGS. 7 and 11, the follower and slot arrangement can be reversed, with the same functional results.

Furthermore, in the embodiment represented by FIG. 6, the trays 4a–e can be prevented from slipping apart by providing a downwardly projecting member (not shown) affixed to the lower portion of the front wall of each of the trays 4a–d, so that the outward displacements of their corresponding adjacent underlying trays 4b–4e will be limited as their respective rear walls 43 come into abutting contact with said projecting members.

What is claimed is:

1. An article carrying case, which comprises an outer case having at least a rear side wall and a bottom, a plurality of stacked open trays for holding articles to be carried in said outer case, the uppermost tray being secured to said outer case in fixed relation to the rear side wall thereof, and means interconnecting said trays to one another to accommodate slidable movement of the lower trays relative to one another and relative to said rear wall along a predetermined path between a stacked position and a terraced position wherein the interiors of said lower trays are accessible, said interconnecting means including for each combination of two adjacent trays, a grooved member carried on one tray, a flange member carried on the other tray and slidably received in said grooved member, and a pin member extending into said flange and grooved members to constrain them for relative sliding movement along a direction parallel to said tray movement path.

2. The article carrying case according to claim 1 wherein for each combination of two adjacent trays, at least one grooved member is carried on the upper tray, and a similar number of flange members are carried on the lower tray, each flange member being slidably received in a corresponding grooved member, said corresponding flange and grooved members being constrained for relative sliding movement by a pin member extending into the flange and grooved members of each corresponding set thereof.

3. The article carrying case according to claim 1 wherein for each combination of two adjacent trays, at least one grooved member is carried on the lower tray, and a similar number of flange members are carried on the upper tray, each flange member being slidably received in a corresponding grooved member, said corresponding flange and grooved members being constrained for relative sliding movement by a pin member extending into the flange and grooved members of each corresponding set thereof.

4. The article carrying case according to claim 1 wherein each of said grooved members has an elongated slot extending parallel to said movement path and wherein the pin member associated with each set of flange and grooved members extends through the grooved member slot and extends into the flange member for movement therewith in sliding engagement with the grooved member slot.

5. The article carrying case according to claim 1 wherein each of said flange members has an elongated slot extending parallel to said movement path and wherein the pin member associated with each set of flange and grooved members extends into the grooved member and at least partially through the flange member slot for movement with the grooved member in sliding engagement with the flange member slot.

6. The article carrying case according to claim 1 wherein said grooved and flange members are integrally constructed with side walls of respective trays.

7. The article carrying case according to claim 1 including a resilient support member extending downwardly from the rear of each tray, except the uppermost and the lowermost, for slidable bearing engagement with the bottom of said outer case as the respective trays move between the stacked and terraced positions.

References Cited by the Examiner

UNITED STATES PATENTS

| | | | |
|---|---|---|---|
| 605,222 | 6/1898 | Gartner | 312—273 |
| 1,568,212 | 1/1926 | Cygan | 312—273 |

FOREIGN PATENTS

| | | |
|---|---|---|
| 5,543 | 1889 | Great Britain. |
| 19,639 | 1894 | Great Britain. |
| 24,961 | 1898 | Great Britain. |

CLAUDE A. LE ROY, *Primary Examiner.*

F. DOMOTOR, *Assistant Examiner.*